US007488382B2

(12) United States Patent
Schubert et al.

(10) Patent No.: US 7,488,382 B2
(45) Date of Patent: Feb. 10, 2009

(54) EFFICIENT MATTING AGENTS BASED ON PRECIPITATED SILICAS

(75) Inventors: Juergen Schubert, Wachtberg (DE); Robert Kuhlmann, Erftstadt (DE); Hans Dieter Christian, Alzenau (DE)

(73) Assignee: Degussa AG, Duesseldorf (DE)

( * ) Notice: Subject to any disclaimer, the term of this patent is extended or adjusted under 35 U.S.C. 154(b) by 556 days.

(21) Appl. No.: 10/656,164

(22) Filed: Sep. 8, 2003

(65) Prior Publication Data

US 2004/0047792 A1 Mar. 11, 2004

(30) Foreign Application Priority Data

Sep. 6, 2002 (DE) ................ 102 41 273

(51) Int. Cl.
*C04B 14/00* (2006.01)
(52) U.S. Cl. ................ 106/400; 523/212; 524/492; 524/493
(58) Field of Classification Search ............ 106/400; 523/212; 524/492–493
See application file for complete search history.

(56) References Cited

U.S. PATENT DOCUMENTS 4,495,167 A 1/1985 Nauroth et al.
5,034,207 A * 7/1991 Kerner et al. ............... 423/339
5,705,137 A 1/1998 Goerl et al.
5,859,117 A 1/1999 Goerl et al.

FOREIGN PATENT DOCUMENTS

| CA | 2255456 | * | 6/1999 |
| DE | 100 58 616 | | 5/2002 |
| EP | 0 078 909 | | 5/1983 |
| EP | 0 922 671 | | 6/1999 |
| EP | 1 348 669 | | 10/2003 |

* cited by examiner

*Primary Examiner*—Jerry Lorengo
*Assistant Examiner*—Pegah Parvini
(74) *Attorney, Agent, or Firm*—Oblon, Spivak, McClelland, Maier & Neustadt, P.C.

(57) ABSTRACT

A precipitated silica characterized by

| BET | 350-550 $m^2/g$ |
| DBP number | 350-400 g/100 g |
| $d_{50}$ | 5-15 μm, and |
| tamped density | 20 to less than 70 g/l. |

28 Claims, No Drawings

EFFICIENT MATTING AGENTS BASED ON PRECIPITATED SILICAS

BACKGROUND OF THE INVENTION

1. Field of the Invention

The present invention relates to efficient matting agents based on precipitated silicas, their preparation, and their use in inks and paints.

2. Description of the Background

Precipitated silicas have been used for a long time as matting agents in paints. The matting properties of these compounds derive from a disperse reflection of light at the paint surface roughened by silica particles. The efficiency of matting agents is therefore determined by the reflection value at different observation angles (generally 60° and 85°) and also the initial mass required for sufficient matting. The surfaces thus treated ought to have a matt, satin gloss, but without any rough effect. The roughness of a surface can be determined, for example, by way of the average roughness value Ra and the depth of roughness Rz. The requirements imposed on matting agents, the necessary measurement methods, and also general information can be found, for example, in Degussa AG's pigment brochure series, No. 21 (2002).

The matting of a paint surface is naturally also dependent on the amount of matting agent used. Since precipitated silicas in addition to their matting effect also cause an increase in the viscosity of the paint, there are limits to the extent to which it is possible to increase the silica fraction in a paint.

The object was therefore to find silicas which at the same mass fraction as the known silicas possess an improved matting effect.

SUMMARY OF THE INVENTION

Surprisingly it has been found that silicas which possess a high DBP absorption constitute very efficient matting agents.

The present invention accordingly provides precipitated silicas characterized by

| | |
|---|---|
| BET | 350-550 m²/g |
| DBP number | 320-400 g/100 g |
| $d_{50}$ | 5-15 µm, and |
| tamped density | 20-90 g/l. |

As well as the untreated hydrophilic silicas, the use of wax-coated silicas as matting agents is also known. A wax treatment of this kind markedly improves the sedimentation behavior of the precipitated silicas.

The present invention therefore further provides wax-coated precipitated silicas characterized by

| | |
|---|---|
| BET | 350-550 m²/g |
| DBP number | 320-400 g/100 g |
| $d_{50}$ | 5-15 µm |
| tamped density | 20-90 g/l |
| carbon content | 2-18% by weight. |

DETAILED DESCRIPTION OF THE INVENTION

The present invention provides precipitated silicas, having use as matting agents, which silicas are characterized by

| | |
|---|---|
| BET | 350-550 m²/g |
| DBP number | 320-400 g/100 g |
| $d_{50}$ | 5-15 µm, and |
| tamped density | 20-90 g/l. |

The present invention also provides such hydrophilic silicas which have been wax-coated, for use as matting agents, characterized by

| | |
|---|---|
| BET | 350-550 m²/g |
| DBP number | 320-400 g/100 g |
| $d_{50}$ | 5-15 µm |
| tamped density | 20-90 g/l |
| carbon content | 2-18% by weight. |

The precipitated silicas of the invention preferably have DBP numbers of from 350 to 380 g/100 g, a $d_{50}$ value of from 7 to 11 µm, or from 8 to 12 µm, preferably from 8 to 9.5 µm, and a tamped density of from 50 to 80 g/l, preferably from 60 to 70 g/l.

The tamped density is determined in accordance with ISO 787-11 directly after the grinding of the silica. The DBP absorption is determined in accordance with DIN 53601, again directly after grinding. (DBP number is a measure of porosity.) The same applies to the measurement of the BET surface area in accordance with ISO 5794-1 Annex D.

The $d_{10}$, $d_{50}$ and $d_{90}$ values are determined by laser diffraction on a Coulter LS-230. ($d_x$ is a value that characterizes the particle distribution, wherein "x" represents a percentage of the measured particles, based on volume, that are smaller than this volume. Thus, $d_{10}$ means that 10% of the measured particles, based on volume, are smaller than this volume. Similarly for $d_{50}$ and $d_{90}$.)

For a uniform matting effect the particle size distribution should be as narrow as possible. The particle size distribution can be determined in a simple way by means, for example, of measurements of the $d_{10}$, $d_{50}$, and $d_{90}$ values. Inventively untreated or wax-coated precipitated silicas therefore have a particle size distribution (span), defined by way of the ratio $(d_{90}-d_{10}):d_{50}$, of from 0.90 to 1.5, preferably from 1.0 to 1.2.

A quantitative determination of the degree of matting of paint film surfaces is frequently determined by measuring the reflection values at different gloss angles. Those found appropriate in practice have been measurements at a gloss angle of 60° and 85°, carried out along the lines of DIN 67530, ISO 2813 or TM 523-78 in accordance with the procedure set out below for determining the gloss value on a standard baked top coat. Untreated or wax-coated precipitated silicas of the invention preferably have gloss values at an angle of 60° of from 15 to 25 and at an angle of 85° of from 30 to 70. The difference between the 85° reflectometer value and the 60° reflectometer value is also referred to as sheen, and allows a statement to be made about the matting effect of the surface at different observation angles. A relatively low sheen means that a surface appears matt when viewed at any angle.

As compared with commercial matting agents, the silica of the invention has a particularly low gloss value at all observation angles. This means that in order to achieve a certain matting effect less material is needed than in the case of conventional matting agents or for a given amount an improved effect is achieved.

Preparation of untreated precipitated silicas of the invention can be carried out in accordance with, for example, DE 10 058 616, which discloses precipitated silicas which in the dry, unground state have a DBP adsorption of from 380 to 420 g/100 g. These silicas are prepared by a) over the course of at least 100 minutes adding water and sulfuric acid simultaneously to maintain a pH of 6-7 to an initial charge of water which is heated at from 35 to 45° C. and is under stirring and shearing, the addition being interrupted for 60-120 minutes, and when addition is at an end setting a solids concentration of 36-42 g/l, b) isolating the solid by filtration and washing the filter cake to completion, and c) subjecting the solid to accelerated drying.

A precipitated silica of this type is preferably subjected to accelerated drying by liquefying the filter cake to a solids content of less than 18% by weight and then spray-drying this suspension. It is also possible to dry the filter cake by means of a spin-flash dryer followed where appropriate by setting of the pH at from 7 to 8 by means of ammonia gas. The precipitated silica obtained in this way can either be ground directly or be first subjected to coating with wax.

The wax coating of the silica of the invention can be carried out, for example, according to EP 1 182 233. In that case precipitated silicas are coated, for example, with polyethylene waxes, Fischer-Tropsch waxes or silicone-based waxes by heat-treating the silicas with the wax at a temperature below the melting range and below the decomposition temperature of the wax in air. It is possible to coat the silica with the wax at the same time as its grinding; in any case, coating with from 2 to 15% by weight, preferably from 5 to 10% by weight, of wax has proven appropriate. The precipitated silicas of the invention ought to have a carbon content of from 2 to 18% by weight, preferably from 3 to 10% by weight, and more preferably a carbon content of from 3 to 6% by weight.

To grind the precipitated silicas of the invention it is possible to use standard commercial mills such as, for example, an impact classifier mill (such as 50 ZPS from Hosokawa-Alpine).

Besides the abovementioned wax coating or impregnation of silica, other methods are known for this purpose and can be consulted in, for example, DE 1 006 100, DE 15 92 865 or EP 0 922 671. Here, wax suspensions are reacted with a silica suspension, where appropriate with the mediation of a dispersant. The wax-impregnated or wax-coated silica thus obtained must subsequently be dried and, where appropriate, reclassified.

The untreated or wax-impregnated precipitated silicas of the invention can be used as matting agents in inks or paints.

Having generally described this invention, a further understanding can be obtained by reference to certain specific examples which are provided herein for purposes of illustration only and are not intended to be limiting unless otherwise specified.

EXAMPLES

A precipitated silica was prepared in accordance with DE 10 058 616, Example 1, and had the following physiochemical data:

| pH | 7.6, |
|---|---|
| DBP | 389 g/100 g, |
| tamped density | 154 g/l, and |
| BET surface area | 454 m²/g, | and was ground to different particle sizes on a 50 ZPS mill. The reference used was Acematt HK 450 (commercially available from Degussa AG), which is a silica used as a matting agent. This untreated matting agent with high matting efficiency is particularly suitable for systems with low level of gloss and sheen, e.g., coil coatings.

The differences in the gloss at 60° and 85° C. from Acematt HK 450 indicate a markedly improved matting effect for an identical amount employed.

| Example | 1 | 2 | 3 | 4 | 5 | Acematt HK 450 |
|---|---|---|---|---|---|---|
| After drying | | | | | | |
| BET [g/m²] | 501 | 458 | 484 | 476 | 472 | 450 |
| DBP [g/100 g] | 383 | 366 | 387 | 412 | 400 | 341 |
| After grinding | | | | | | |
| d50 [µm] | 9.5 | 9.3 | 10.1 | 10.1 | 10.6 | 10.2 |
| Span | 0.97 | 0.95 | 0.99 | 1.07 | 1.21 | 1.10 |
| DBP [g/100 g] | 361 | 333 | 359 | 358 | 352 | 314 |
| Tamped density [g/l] | 56 | 60 | 57 | 58 | 59 | 90 |
| Paint testing | | | | | | |
| Initial mass [g] | 4.5 | 4.5 | 4.5 | 4.5 | 4.5 | 4.5 |
| Grindometer value [µm] | 30 | 29 | 30 | 30 | 30 | 35 |
| Gloss 60° | 18.8 | 20.0 | 17.0 | 18.1 | 18.2 | 21.3 |
| Gloss 85° | 56.6 | 59.3 | 51.7 | 54.3 | 55.1 | 55.1 |
| Sheen | 37.8 | 39.3 | 34.7 | 36.2 | 36.9 | 33.8 |
| Diff. gloss 60° from HK 450 Std. | −2.5 | −1.3 | −4.3 | −3.2 | −3.1 | |
| Diff. gloss 85° from HK 450 Std. | 1.5 | 4.2 | −3.4 | −0.8 | 0.0 | |
| Initial mass [g] | 5.5 | 5.5 | 5.5 | 5.5 | 5.5 | 5.5 |
| Grindometer value [µm] | 32 | 31 | 32 | 32 | 32 | 34 |
| Gloss 60° | 11.7 | 14.8 | 12.0 | 10.7 | 11.9 | 15.6 |
| Gloss 85° | 25.4 | 37.3 | 26.6 | 22.9 | 26.3 | 43.6 |
| Sheen | 13.7 | 22.5 | 14.6 | 12.2 | 14.4 | 28.0 |
| Diff. gloss 60° from HK 450 Std. | −3.9 | −0.8 | −3.6 | −4.9 | −3.7 | |
| Diff. gloss 85° from HK 450 Std. | −18.2 | −6.3 | −17.0 | −20.7 | −17.3 | |

The paint investigations described were carried out in the standard black test paint Duplex D1326 Schwarzlack from Herberts, Austria.

General Procedure for Determining the Gloss Values

Preparation of the Matt Paint 100 g of DUPLEX D 1326 paint (formulation number L 87992, DuPont, Herberts Austria GmbH) are weighed out into a 350 ml polyethylene beaker and 20 g of diluent V 0003 (DuPont, Herberts Austria GmbH) are weighed in. The required amount of matting agent is then weighed out to an accuracy of 10 mg and carefully incorporated into the diluted test paint using a spatula. Thereafter the composition is dispersed at 2000 rpm for 10 minutes using a ø 43 mm paddle stirrer, the PE beaker being covered in order to prevent evaporation losses. After the matting agent has been incorporated the matted paint is left to stand in the closed beaker for 30 minutes for deaeration. It should be ensured that the standard (HK 450) is dispersed at around the same time as the samples under investigation (maximum time difference: 3 hours).

Testing and Processing of the Matt Paint

Following deaeration, the paint is applied using a motorized drawing device (Erichsen Coatmaster 509 MC) using a four-edged coating bar with a slot height of 120 μm at a speed of 25 mm/s to cleaned glass plates measuring 130×90×3 mm. For each dispersed sample, 2 glass plates are to be coated. In each baking operation, these specimen plates are to be examined against 2 plates of the standard. The maximum occupancy of an oven tray is 10 sample plates+2 standards.

The applied paint is flashed off under the following specified conditions:

| | |
|---|---|
| temperature: | 20° C. to 25° C. |
| relative humidity: | 40% to 60% |
| flashoff time: | 10 min to 20 min |

The paint is subsequently baked in a forced-air drying cabinet at 150° C. for 20 minutes.

The reflectometer values are measured on the BYK Haze Gloss after the glass plates have cooled (about 30 minutes). The reflectometer value is formed from the average of the duplicate determination.

Where the duplicate determination produces differences>2 gloss points, the duplicate determination must be repeated against the standard using a sample which must be dispersed anew.

The disclosure in German priority application 102 41 273.1, filed Sep. 6, 2002, is hereby incorporated by reference.

What is claimed is:

1. A precipitated silica characterized by

| | |
|---|---|
| BET | 350-550 m²/g |
| DBP number | 350-400 g/100 g |
| $d_{50}$ | 5-15 μm, and |
| tamped density | 20 to less than 70 g/l. |

2. The precipitated silica as claimed in claim 1, wherein the particle size distribution $$\frac{d_{90} - d_{10}}{d_{50}}$$

is from 0.90 to 1.5.

3. The precipitated silica as claimed in claim 1, wherein the gloss angle gloss values are:

| | |
|---|---|
| 60° | 15-25 and |
| 85° | 50-70. |

4. The precipitated silica as claimed in claim 2, wherein the gloss angle gloss values are:

| | |
|---|---|
| 60° | 15-25 and |
| 85° | 50-70. |

5. A process for increasing the matting effect of a paint or ink comprising adding the precipitated silica as claimed in claim 1 as a matting agent to said paint or ink.

6. A paint or ink, which includes the precipitated silica as claimed in claim 1 as a matting agent.

7. A process for increasing the matting effect of a paint or ink comprising adding the precipitated silica as claimed in claim 2 as a matting agent to said paint or ink.

8. A paint or ink, which includes the precipitated silica as claimed in claim 2 as a matting agent.

9. A process for increasing the matting effect of a paint or ink comprising adding the precipitated silica as claimed in claim 3 as a matting agent to said paint or ink.

10. A paint or ink, which includes the precipitated silica as claimed in claim 3 as a matting agent.

11. A process for increasing the matting effect of a paint or ink comprising adding the precipitated silica as claimed in claim 4 as a matting agent to said paint or ink.

12. A paint or ink, which includes the precipitated silica as claimed in claim 4 as a matting agent.

13. A wax-coated precipitated silica characterized by

| | |
|---|---|
| BET | 350-550 m²/g |
| DBP number | 350-400 g/100 g |
| $d_{50}$ | 5-15 μm |
| tamped density | 20 to less than 70 g/l |
| carbon content | 2-18% by weight. |

14. The wax-coated precipitated silica as claimed in claim 13, wherein the particle size distribution $$\frac{d_{90} - d_{10}}{d_{50}}$$

is from 0.90 to 1.5.

15. A wax-coated precipitated silica as claimed in claim 13, wherein the gloss angle gloss values are:

| | |
|---|---|
| 60° | 15-25 and |
| 85° | 50-70. |

16. A wax-coated precipitated silica as claimed in claim 14, wherein the gloss angle gloss values are:

| | |
|---|---|
| 60° | 15-25 and |
| 85° | 50-70. |

17. A process for increasing the matting effect of a paint or ink comprising adding the precipitated silica as claimed in claim 13 as a matting agent to said paint or ink.

18. A paint or ink, which includes the precipitated silica as claimed in claim 13 as a matting agent.

19. A process for increasing the matting effect of a paint or ink comprising adding the precipitated silica as claimed in claim 14 as a matting agent to said paint or ink.

20. A paint or ink, which includes the precipitated silica as claimed in claim 14 as a matting agent.

21. A process for increasing the matting effect of a paint or ink comprising adding the precipitated silica as claimed in claim 15 as a matting agent to said paint or ink.

22. A paint or ink, which includes the precipitated silica as claimed in claim 15 as a matting agent.

23. A process for increasing the matting effect of a paint or ink comprising adding the precipitated silica as claimed in claim 16 as a matting agent to said paint or ink.

24. A paint or ink, which includes the precipitated silica as claimed in claim 16 as a matting agent.

25. The precipitated silica as claimed in claim 1, wherein the $d_{50}$ value is from 7-11 μm.

26. The wax-coated precipitated silica as claimed in claim 13, wherein the $d_{50}$ value is from 7-11 μm.

27. The precipitated silica as claimed in claim 1, wherein the tamped density is 20-60 g/l.

28. The wax-coated precipitated silica as claimed in claim 13, wherein the tamped density is 20-60 g/l.

* * * * *